United States Patent
Ishikawa et al.

(10) Patent No.: US 6,453,166 B1
(45) Date of Patent: Sep. 17, 2002

(54) COMMUNICATION CHANNEL SELECTING METHOD AND BASE STATION DEVICE

(75) Inventors: Yoshihiro Ishikawa; Etsuhiro Nakano; Minami Ishii; Masafumi Hata; Seizo Onoe, all of Kanagawa (JP)

(73) Assignee: NTT Mobile Communications Network Inc., Tokyo (JP)

(*) Notice: Subject to any disclaimer, the term of this patent is extended or adjusted under 35 U.S.C. 154(b) by 0 days.

(21) Appl. No.: 09/402,034
(22) PCT Filed: Jan. 28, 1999
(86) PCT No.: PCT/JP99/00357
§ 371 (c)(1), (2), (4) Date: Feb. 1, 2000
(87) PCT Pub. No.: WO99/39536
PCT Pub. Date: Aug. 5, 1999

(30) Foreign Application Priority Data

Jan. 28, 1998 (JP) .......................... 10-015859

(51) Int. Cl.[7] .................................. H04Q 3/20
(52) U.S. Cl. ............... 455/450; 455/434; 455/501; 455/513
(58) Field of Search .................. 455/450, 451, 455/452, 434, 463, 464, 501, 509, 513, 514, 515, 524, 525, 63, 67.1, 67.3, 561, 522, 69, 70

(56) References Cited

U.S. PATENT DOCUMENTS 5,475,868 A * 12/1995 Duque-Anton et al. ........ 455/62
5,497,505 A * 3/1996 Koohgoli et al. ............ 455/452
5,956,638 A * 9/1999 Chang et al. ............... 455/423
5,956,642 A * 9/1999 Larsson et al .............. 455/449

FOREIGN PATENT DOCUMENTS

| JP | 1-080135 | 3/1989 |
| JP | 5-145460 | 6/1993 |
| JP | 7-507190 | 8/1995 |
| JP | 10-013937 | 1/1998 |
| WO | WO94-13069 | 6/1994 |

* cited by examiner

Primary Examiner—Edward F. Urban
Assistant Examiner—Temica M. Davis
(74) Attorney, Agent, or Firm—Brown Raysman Millstein Felder & Steiner

(57) ABSTRACT

A decision is made as to whether a radio base station acting as an interference source is present in a macrocell or microcell, so that the interference from a mobile station transmitting high power can be presented in advance. The base station inserts its transmission power value of a forward broadcast channel into broadcast information. A newly installed base station C, receiving a forward frequency band, measures the received level of the broadcast channel, and captures the transmission power value. When the transmission power value is large, the threshold value is reduced (THRb), and when the transmission power value is small, the threshold value is increased (THRa). If the received level L is less than the threshold value, a decision is made that the channel is available.

5 Claims, 9 Drawing Sheets

| RANGE | THRESHOLD VALUE CORRECTING DATA |
|---|---|
| $P \geq Pmax$ → | $THR\_corr1$ |
| $P1 > P \geq P2$ → | $THR\_corr2$ |
| $P2 > P \geq P3$ → | $THR\_corr3$ |
| ⋮ | ⋮ |
| $Pmin > P$ → | $THR\_corrN$ |

FIG.5

COMMUNICATION CHANNEL SELECTING METHOD AND BASE STATION DEVICE

TECHNICAL FIELD

The present invention relates to a traffic channel selecting method and base station equipment preferable for constructing a mobile communications system including a plurality of radio base stations and mobile stations.

More particularly, the present invention relates to a traffic channel selecting method and base station equipment applicable to such systems as a mobile communications system including a plurality of radio base stations and a plurality of mobile stations that carry out communications with them, and in particular to a system whose service area consists of a plurality of radio base stations assuming various cell radii, or to a system in which a plurality of systems, whose mobile stations that receive their services have different characteristics, share the same frequency band.

BACKGROUND ART

A mobile communications system such as mobile phones or car phones which are widely available today carries out its services by dividing its service area into comparatively small radio zones referred to as cells. Such a system comprises as shown in FIG. 1 a plurality of radio base stations 111 that cover the divided radio zones, and a plurality of mobile stations 112 that conduct communications with the base stations 111 by establishing radio channels.

Radio waves transmitted from the base stations 111 or mobile stations 112 at certain transmission power levels propagate through the space with their powers attenuated, and arrive at their destination terminals. The attenuation the ratio waves undergo increases with the distance between the transmitting terminals and the receiving terminals.

On the other hand, the receiving terminals require a specific level or over of the received power to achieve demodulation of the received radio wave at a desired quality.

Accordingly, increasing cell radii to extend the cover areas of the base stations requires to install in the base stations and mobile stations transmission equipment with greater power. In contrast, reducing the cell radii to decrease the cell areas can reduce the transmission power required by the base stations and mobile stations.

In the mobile communications, a processing what is called handover is carried out to continue communications by successively switching the radio base stations with the roaming of a mobile station. The handover processing, when considered from the standpoint of the cell radius, presents the following problem as the cell radius reduces. That is, the frequency of the handover processing rises, which in turn increases the processing load of the network. When instantaneous interruption takes place because of the handover, it has great influence on the conversation quality a user feels. It is also possible that the handover processing cannot catch up with the roaming of the mobile station, so that the conversation can be disconnected.

It will be understood from the description above that small radius cells are suitable for terminal equipment with low transmission power carried by pedestrians, whereas large radius cells are appropriate for terminal equipment with comparatively large power carried on motor vehicles. Thus, the small and large radius cells have their own advantages and disadvantages. Generally, a comparatively large cell with a radius from one kilometer to a few kilometers is often called a macrocell, and a rather small cell with a radius of a few hundred meters is commonly called a microcell.

Incidentally, users are not uniformly distributed geographically, but concentrate to limited places or roads. In view of this, such a method is taken that the macrocells roughly cover the area, and the microcells cover the places and roads in the area where the users concentrate.

Such a method that forms the area with the macrocells in combination with microcells is referred to as a micro/macro overlay system in the present specification.

The micro/macro overlay system is characterized in its establishing method of the radio channels. In the macrocells, the network conventionally carries out centralized management of the entire channels employed by the base stations.

In contrast with this, since the microcells are located in various propagation environments such as outdoors, underground shopping center and buildings in front of a station or in bustling streets as well as in homes, it is very difficult to assign radio channels considering the interference between the microcells. Since the systems in homes or offices operate as individual systems, it is difficult to apply to them a centralized management style assignment method. Thus, a method is desired in which the individual base stations establish their radio channels through their own autonomous control.

Conventionally, as a method for making a decision as to whether a particular channel is available or not, a radio base station or mobile station measures the received power of interference signals, and decides that the channel is available when the received power (interference power) is less than a fixed level.

However, applying the conventional method to the micro/macro overlay system, in which the microcells and macrocells share a common radio frequency band, has a great problem of being unable to avoid the interference between them.

FIG. 2 shows an example of making a decision as to whether a radio channel is available in a microcell adjacent to a macrocell. In FIG. 2, the horizontal axis represents distance, and the vertical axis represents transmission power or received power. Base stations A and C are low power base stations forming a microcell each. The base station A transmits at transmission power Pa through a radio channel f1. The base station B is a high power base station forming a macrocell, and transmits at transmission power Pb using a radio channel f2.

In FIG. 2, the base station C is newly installed in addition to the base stations A and B, assuming that the base station C autonomously determines the radio channel of its own use. As shown in FIG. 2, when the base station C receives signals from both the base stations A and B, the received levels of the signals at the base station C are identical at level L. If the level L is lower than the threshold value THR, both the frequencies f1 and f2 are available.

Let us consider here the interference given to the base station C from the mobile stations a and b that carry out communications with the base stations A and B, respectively. When the base station C selects the radio channel f1, it receives the interference from the mobile station a with low transmission power, which does not presents any problem. However, when the base station C selects the radio channel f2, it will receive the interference from the mobile station b with high transmission power. Thus, the base station C cannot use the radio channel f2 in practice.

Thus, in the conventional decision making as to whether the channel is available, the interference between the microcell and macrocell is unavoidable.

In view of this, therefore, a first object of the present invention is to propose a traffic channel selecting method and station equipment capable of avoiding in advance the interference from a mobile station transmitting at large power by making a decision as to whether the radio base station causing the interference is present in a macrocell or microcell.

A second object of the present invention is to propose a traffic channel selecting method and base station equipment capable of avoiding the occurrence of the interference, and constructing a mobile communications system with high quality and high frequency usage efficiency in a system whose service area consists of a plurality of radio base stations assuming various cell radii, or in a system in which a plurality of systems, whose mobile stations that receive their services have different characteristics, share the same frequency band.

DISCLOSURE OF THE INVENTION

In the first aspect of the present invention, there is provided a traffic channel selecting method in a mobile communications system including a plurality of radio base stations, comprising the steps of:

referring, in the particular radio base station, to transmission power read from a channel transmitted from each of remaining radio base stations;

correcting the threshold value such that the threshold value is reduced when the transmission power is large, and that the threshold value is increased when the transmission power is small; and making a decision, by comparing a received level measured in the channel with the threshold value corrected, that the channel is available if the received level measured is lower than the threshold value, whereby setting a threshold value of a received level used for deciding availability of a traffic channel in a particular radio base station.

In the second aspect of the present invention, there is provided a traffic channel selecting method in a mobile communications system including a plurality of radio base stations, comprising the steps of:

referring, in the particular radio base station, to transmission power read from a channel transmitted from each of remaining radio base stations;

calculating, in the particular radio base station, a propagation loss between the particular radio base station and each of remaining radio base stations; and making a decision that the channel is available, if a received level acquired by receiving the channel transmitted from each of the remaining radio base stations is less than a predetermined received level, and the propagation loss of the channel is less than a predetermined threshold value of the propagation loss, whereby making a decision on availability of a traffic channel in a particular radio base station.

In the third aspect of the present invention, there is provided base station equipment installed in a particular radio base station in a mobile communications system including a plurality of radio base stations, the base station equipment comprising:

means for measuring a received level of a channel transmitted from each of remaining radio base stations;

means for reading a transmission power value of the channel from each of the remaining radio base stations; and means for making a decision on availability of the channel by the particular radio base station from the received level measured and the transmission power value read.

Here, the base station equipment may further comprise:

means for storing a threshold value of the received level in correspondence with the received level of the channel transmitted from each of the remaining radio base stations;

means for correcting, in accordance with the transmission power value of the channel from each of the remaining radio base stations, the threshold value of the received level stored; and means for making a decision on the availability of the channel in the particular radio base station by comparing the received level with the threshold value corrected.

The base station equipment may further comprise:

means for storing a first threshold value corresponding to the received level of the channel transmitted from each of the remaining radio base stations;

means for calculating a propagation loss between the particular radio base station and each of the remaining radio base stations from the received level and the transmission power value of the channel from each of the remaining radio base stations;

means for storing a second threshold value in correspondence with the propagation loss calculated;

means for comparing the first threshold value with the received level;

means for comparing the second threshold value with the propagation loss; and means for making a decision on availability of the channel in the particular radio base station from a result of comparing the first threshold value with the received level, and a result of comparing the second threshold value with the propagation loss.

BRIEF DESCRIPTION OF THE DRAWINGS

FIG. 5 is a table of data stored in a memory;

BEST MODE FOR CARRYING OUT THE INVENTION

The embodiments in accordance with the present invention will now be described with reference to the accompanying drawings.

Figure 1:
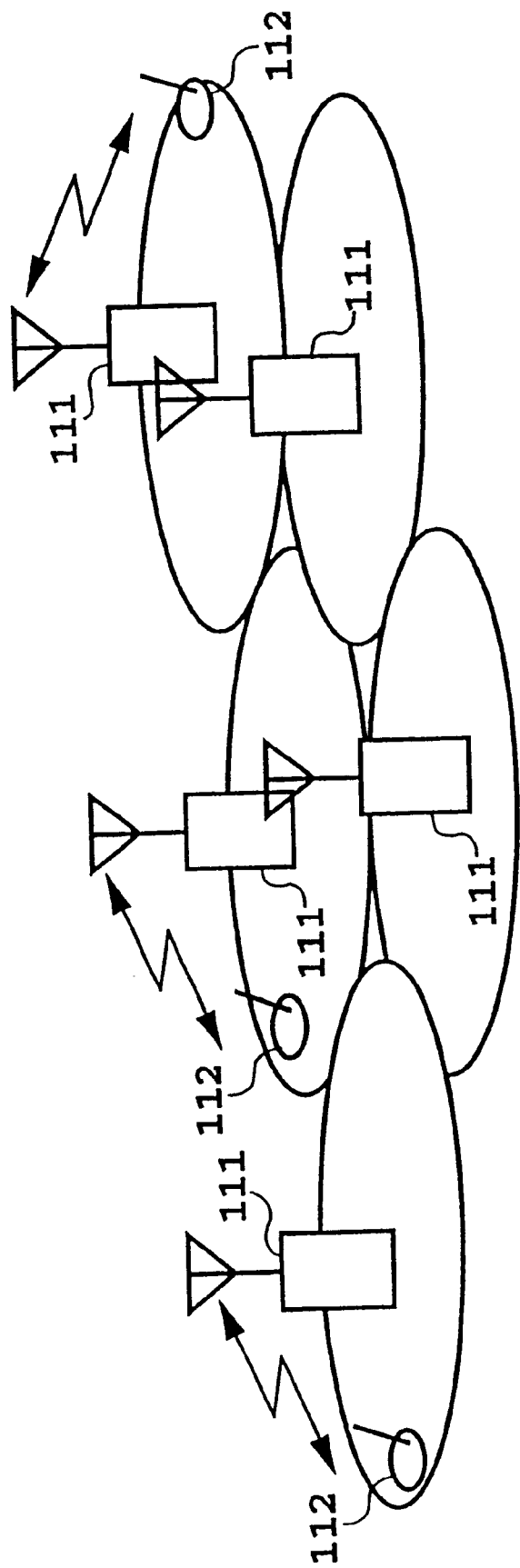
FIG. 1 is a block diagram showing an overall configuration of a mobile communications system to which the present invention is applied.
Figure 2:
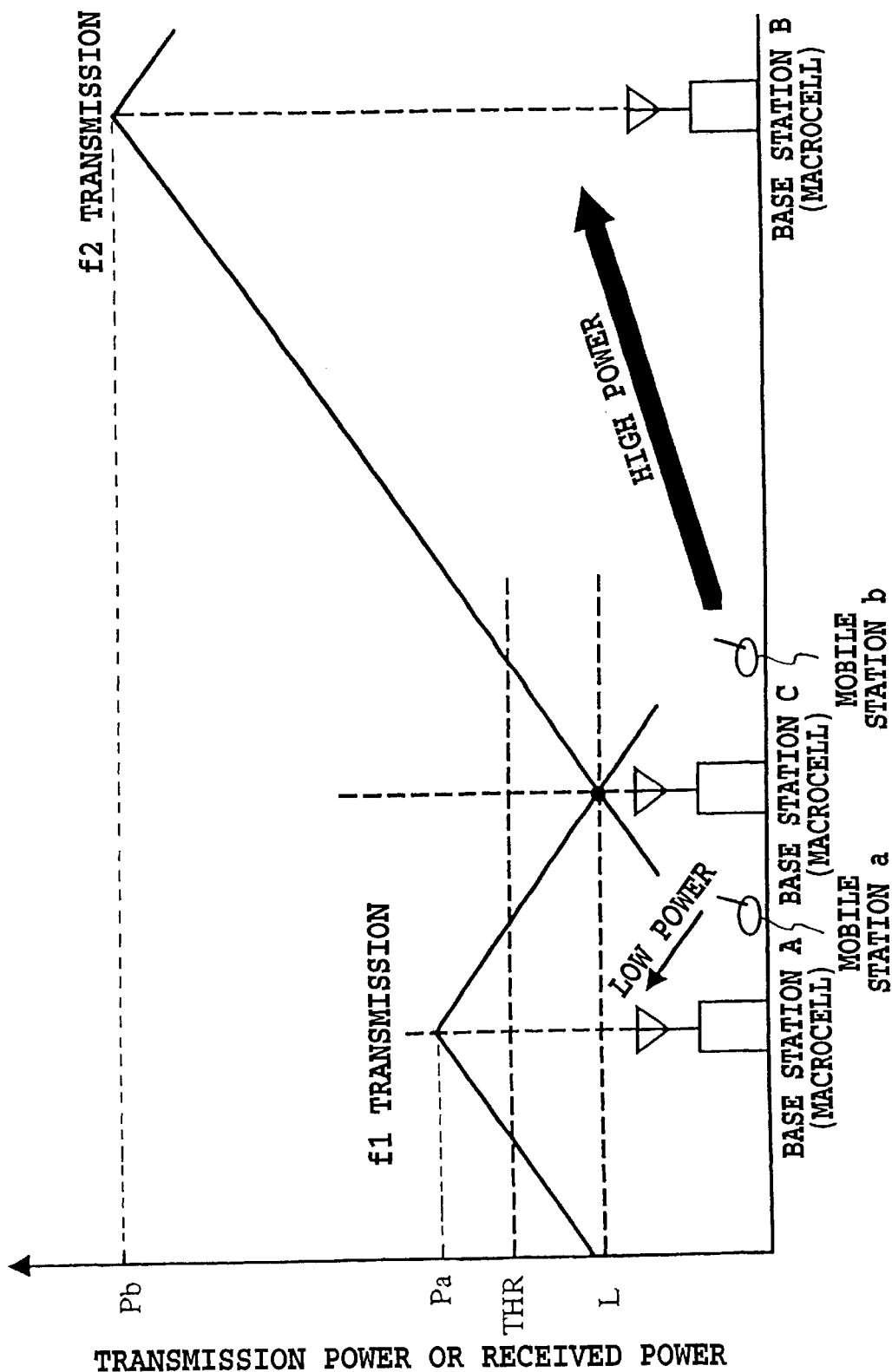
FIG. 2 is a diagram for illustrating an example of making a decision about channel availability when a conventional technique is applied.
Figure 3:
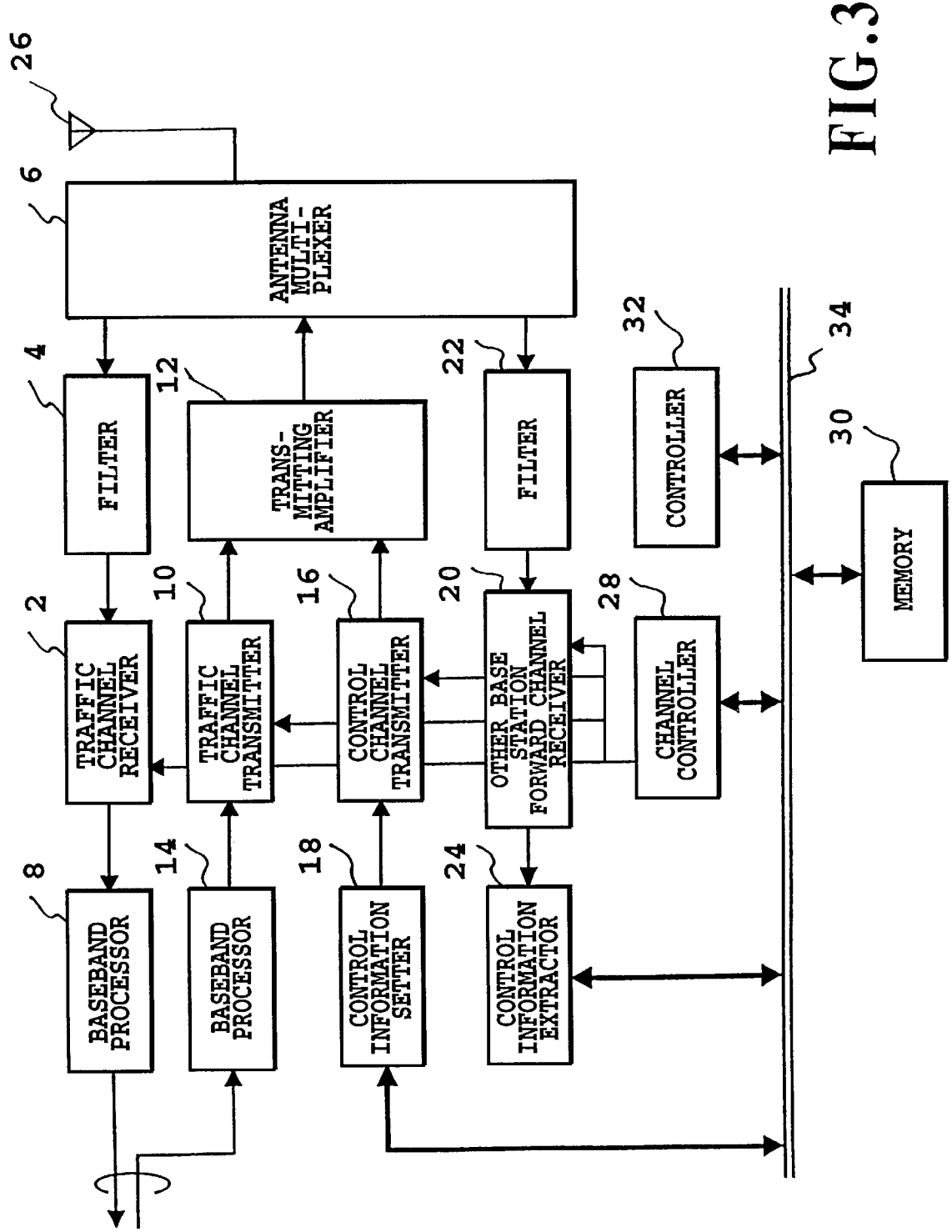
FIG. 3 is a block diagram showing an overall configuration of a radio base station to which the present invention is applied.

FIG. 3 is a block diagram showing an overall configuration of radio base station equipment to which the present invention is applied. A traffic channel receiver 2 is connected to an antenna multiplexer 6 through a filter 4. The data received by the receiver 2 is processed by a baseband processor 8, and is transmitted to a switching center (not shown). A traffic channel transmitter 10 is connected to the antenna multiplexer 6 through a transmitting amplifier 12. The data transmitted from the switching center is processed by a baseband processor 14, and is supplied to the transmitter 10. A control channel transmitter 16 is also connected to the antenna multiplexer 6 through the transmitting amplifier 12. The data to be transmitted by the transmitter 16 is set by a control information setter 18. A receiver 20 for receiving a forward channel of another base station is connected to the antenna multiplexer 6 through a filter 22. The data received by the receiver 20 is supplied to a control information extractor 24 for extracting control information.

The antenna multiplexer 6 is connected to an antenna 26. A bus 34 interconnects the control information setter 18; the control information extractor 24; a channel controller 28 for establishing channels of the transmitters 10 and 16, and the receivers 2 and 20; a memory 30 for storing various parameters such as threshold values for channel selection; and a controller 32 for selecting channels by making a decision on channel availability on the basis of the control information received from other radio base stations and the threshold values stored in the memory 30.

In a system employing different frequencies for the forward and reverse links (called FDD (Frequency Division Duplex) from now on), the receiver 20 for receiving the forward channels of other base stations uses frequency bands different from those of the traffic channel receiver 2. In a system dividing the forward and reverse links by time slots (called TDD (Time Division Duplex) from now on), the receivers 2 and 20 use channels in the same frequency band.

Incidentally, although the dedicated receiver 20 is installed in FIG. 3 for receiving forward channels of other base stations, the embodiment in accordance with the present invention is not limited to this. In either the FDD or TDD, the dedicated receiver is not essential. For example, the present invention is applicable and achieves a similar effect by setting the traffic channel receiver 2 and filter 4 to receive the forward channels of other base stations to make them a means for receiving those channels.

First Embodiment

Figure 4:
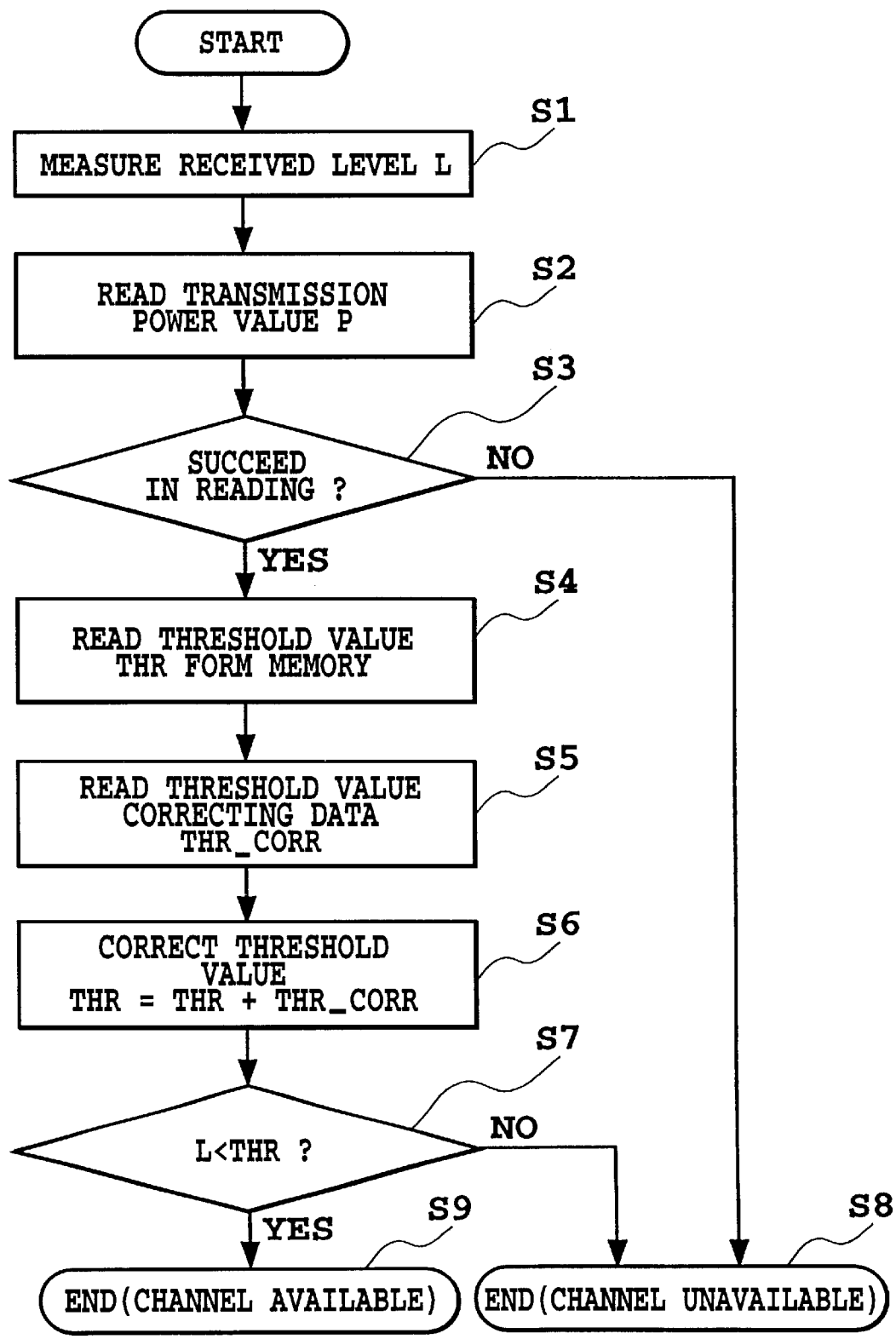
FIG. 4 is a flowchart illustrating a first embodiment in accordance with the present invention.

FIGS. 4 and 5 show a first embodiment in accordance with the present invention. FIG. 4 is a flowchart illustrating a control sequence of the controller 32 in the base station C. FIG. 5 is a schematic diagram illustrating the structure of the data stored in the memory 30 in the base station C.

Steps of FIG. 4 are each controlled by the controller 32 (see, FIG. 3). At step S1, the base station C receives the broadcast channels transmitted from other radio base stations A and B, and measures their received levels L. At the next step S2, transmission power values P in the broadcast channels of the other radio base stations A and B are read. If the reading succeeds ("Yes" at step S3), the processing proceeds to step S4, whereas if the reading is unsuccessful, the processing makes a decision that the channel is unavailable, and proceeds to step S8.

At step S4, the threshold value THR of the received level is read from the memory 30 to be compared with the received level L (see, FIG. 5).

At step S5, a decision is made with reference to the table stored in the memory 30 as shown in FIG. 5 as to which one of the power value ranges the transmission power value P belongs to, and the threshold value correction data THR_corri(i=1, 2, . . . , N) are read. At the next step S6, the threshold value is corrected (THR=THR+THR_corri). That is, a new threshold value is defined by adding THR_corri to the threshold value THR.

At step S7, the received levels L are compared with the corrected threshold value THR. If L<THR, a decision is made that the channel is available, and the processing proceeds to step S9. Otherwise ("No" at step S7), a decision is made that the channel is unavailable, and the processing proceeds to step S8.

In the first embodiment as shown in FIG. 4, the corrected data of the threshold value are stored in the memory 30 as shown in FIG. 5 in connection with the transmission power values of the transmitting stations. This, however, does not restrict the embodiment in accordance with the present invention.

For example, the threshold values themselves can be stored in correspondence with the transmission power values of the transmitting stations. Alternatively, instead of using the table, the threshold values can be calculated using an equation expressing the threshold value as a function of the transmission power of the transmitting stations. Thus, although the threshold value can be processed in various ways, the present invention is applicable as long as it operates such that the threshold value is reduced with an increase in the transmission power of the transmitting station, and is increased with a decrease in the transmission power of the transmitting stations.

Figure 6:
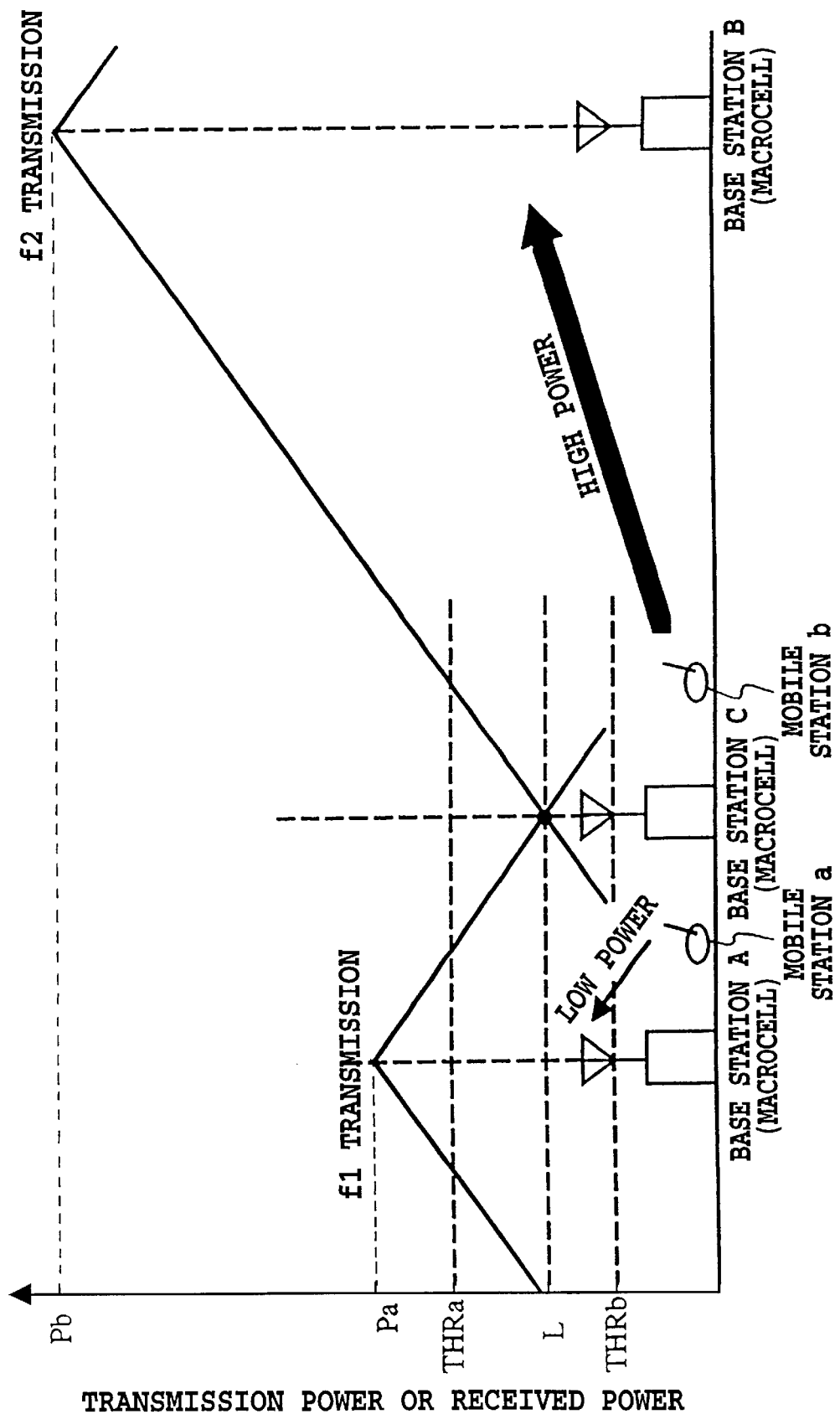
FIG. 6 is a diagram for illustrating an example of making a decision about the channel availability in the first embodiment in accordance with the present invention.

FIG. 6 illustrates a decision example of the radio channel availability in a microcell adjacent to a macrocell. In FIG. 6, the horizontal axis represents the distance, and the vertical axis represents the transmission power or received power. The base stations A and C are low power base stations constituting the microcells, and assume that their transmission power is Pa (W), and the base station A employs the radio channel f1 for the transmission. The base station B is a high power base station that constitutes the macrocell, and assumes that its transmission power is Pb (W), where Pa<Pb, and uses the radio channel f2 for the transmission.

In FIG. 6, it is assumed that the base stations A and B have been operating already, and the base station C, which is newly added, autonomously determines its own radio channels to be used. As shown in FIG. 6, the base station C receives signals transmitted from the base stations A and B, and their received levels at the base station C are identical at L. Since the transmission power of the base station B is greater than that of the base station A (Pa<Pb), the threshold value THRa is set greater than the threshold value THRb as shown in FIG. 6, where THRa is the threshold value to be compared with the received power from the base station A to determine the availability of the radio channel f1 in the base station C, and THRb is the threshold value to be compared with the received power from the base station B to determine the availability of the radio channel f2 in the base station C.

Accordingly, although the radio channel f1 is decided to be available because the received level is lower than THRa, the radio channel f2 is decided to be unavailable because the received level is higher than THRb. As a result, the interference from the high power mobile station b can be prevented in advance, thereby providing high quality voice communications.

Second Embodiment

Figure 7:
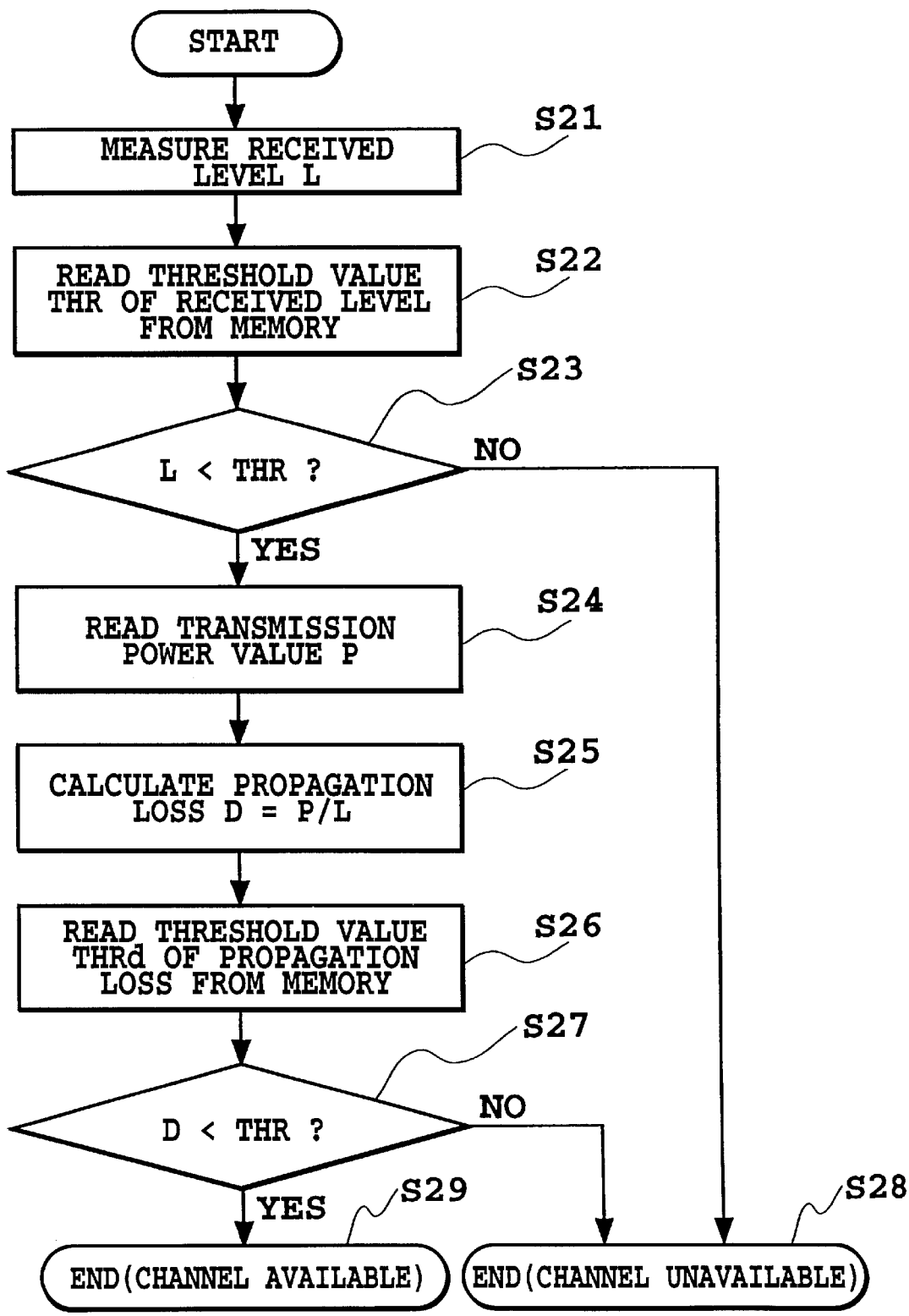
FIG. 7 is a flowchart illustrating a second embodiment in accordance with the present invention.
Figure 8:
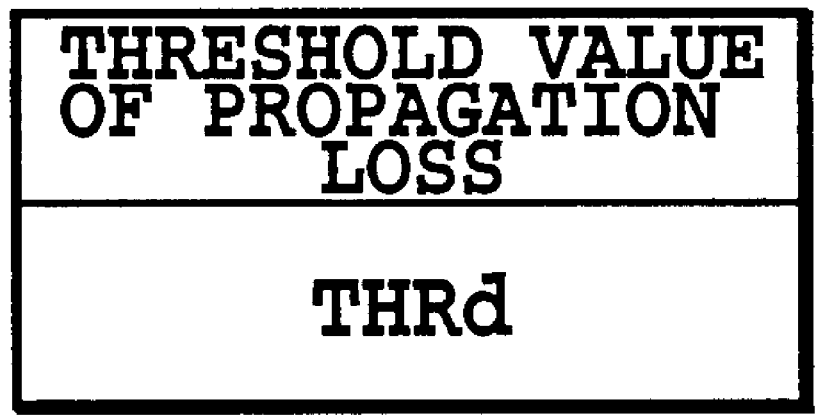
FIG. 8 is a table of data stored in a memory in the second embodiment in accordance with the present invention.

FIGS. 7 and 8 show a second embodiment in accordance with the present invention. FIG. 7 is a flowchart illustrating a control sequence of the controller 32 in the base station C.

FIG. 8 is a schematic diagram illustrating the structure of the data stored in the memory 30 in the base station C.

Steps of FIG. 7 are each controlled by the controller 32 (see, FIG. 3). At step S21, the base station C receives the broadcast channels transmitted from other radio base stations A and B, and measures their received levels L. At the next step S22, the received level threshold value THR is read from the memory 30 to be compared with the received level L (see, FIG. 8).

At step S23, if a decision is made that L<THR, the processing proceeds to step S24. Otherwise, a decision is made that the channel is unavailable, and the processing proceeds to step S28.

At step S24, the transmission power values P of the transmitting stations are read. Subsequently, at the next step S25, the propagation loss D=P/L is calculated.

At step S26, the threshold value THRd of the propagation loss is read from the memory 30 to be compared with the calculated propagation loss (see, FIG. 8).

At step S27, the calculated propagation loss D is compared with the threshold value THRd. If D<THRd, a decision is made that the channel is available, and the processing proceeds to step S29. Otherwise ("No" at step S27), a decision is made that the channel is unavailable, and the processing proceeds to step S28.

Figure 9:
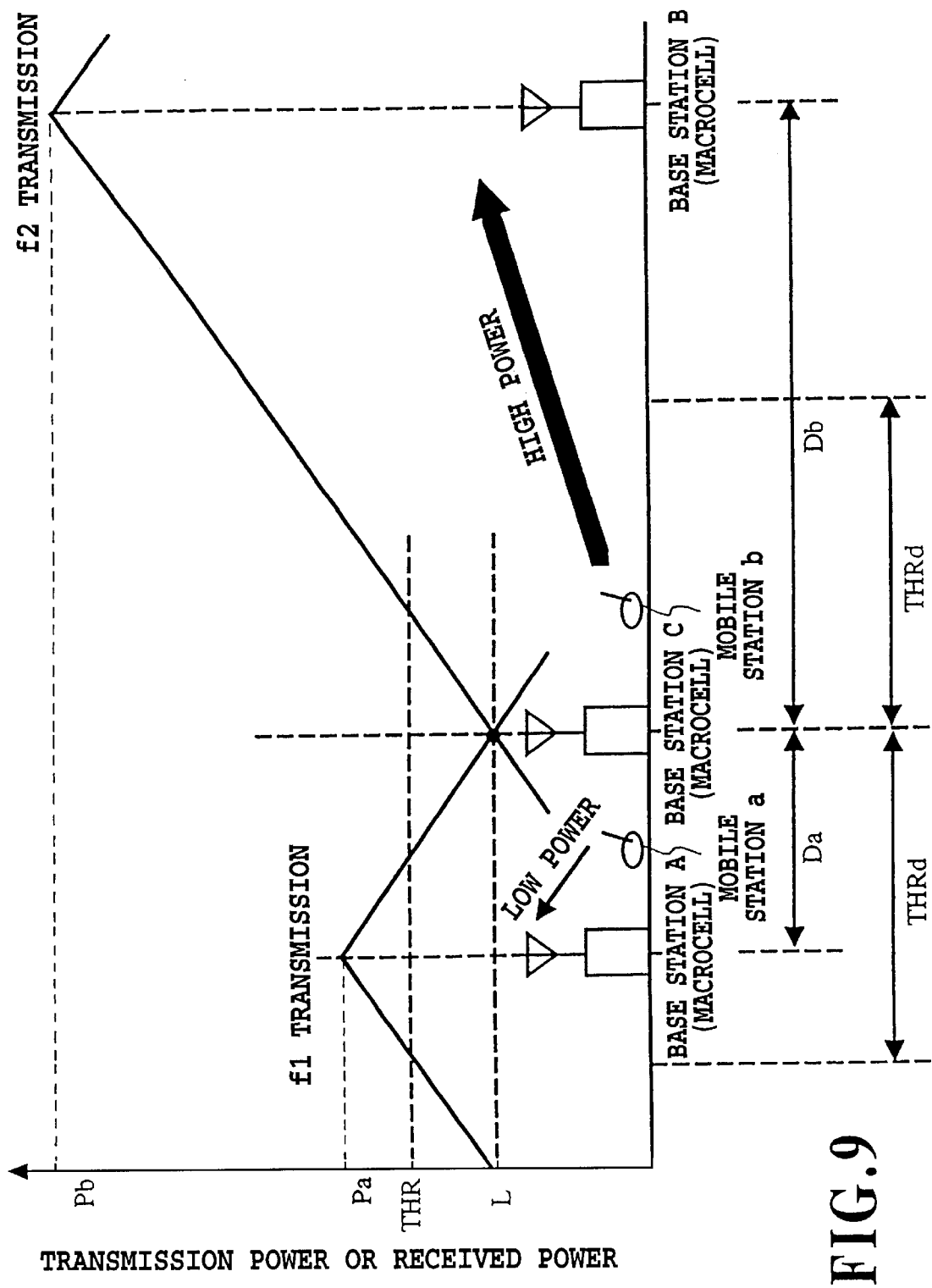
FIG. 9 is a diagram for illustrating an example of making a decision about the channel availability in the second embodiment in accordance with the present invention.

FIG. 9 illustrates a decision example of the radio channel availability in a microcell adjacent to a macrocell. In FIG. 9, the horizontal axis represents the distance, and the vertical axis represents the transmission power or received power. The base stations A and C are low power base stations constituting the microcells, and assume that their transmission power Pa (W), and the base station A employs the radio channel f1 for the transmission. The base station B is a high power base station that constitutes the macrocell, and assumes that its transmission power is Pb (W), where Pa<Pb, and uses the radio channel f2 for the transmission.

In FIG. 9, it is assumed that the base stations A and B have been operating already, and the base station C, which is newly added, autonomously determines its own radio channels to be used. As shown in FIG. 9, the base station C receives signals transmitted from the base stations A and B, and their received levels at the base station C are identical at L. In FIG. 9, it is further assumed that the received level L is lower than the threshold value THR to be compared with the received level, and hence the base station C can use both the radio channels f1 and f2 from the view point of the received level.

However, since the transmission power of the base station B is greater than that of the base station A (Pa<Pb), comparing the propagation loss Da with Db, it is seen that Db is greater than Da as shown in FIG. 9, where Da is the propagation loss between the base stations A and C, which is estimated from the received level and transmission power value of the transmitting station, and Db is the propagation loss between the base stations B and C, which is estimated in the same manner. Generally, because the propagation loss has such a property that increases with the distance, the propagation loss in FIG. 9 is drawn in correspondence with the distance to help understanding.

Accordingly, although the radio channel f1 is decided to be available because the propagation loss is lower than THRd, the radio channel f2 is decided to be unavailable because the propagation loss is higher than THRd. As a result, the interference from the high power mobile station b can be prevented in advance, thereby providing high quality voice communications.

As described above, the present invention can employ various types of radio access schemes such as FDMA, TDMA, and CDMA, and can be applied to mobile communications systems adopting any of these schemes.

As will be understood from the above, the base station in accordance with the present invention place into the broadcast information the transmission power values of the forward broadcast channel (forward perch). The newly installed base station C, receiving the forward frequency band, measures the received level of each broadcast channel, and acquires the transmission power values. If the transmission power value is large, the threshold value of the received level is reduced (THRb), whereas if the transmission power value is small, the threshold value of the received level is increased (THRa). If the received level L is less than the threshold values thus determined, a decision is made that the channel is available.

In the other embodiment in accordance with the present invention, the propagation loss is calculated from the received level of the broadcast channel and the transmission power value acquired, and if the propagation loss is less than the threshold value of the propagation loss, and the received level is less than the threshold value of the received level, a decision is made that the channel is available.

INDUSTRIAL APPLICABILITY

As described above, according to the present invention, a decision is made as to whether the radio base station acting as an interference source is present in the macrocell or microcell. This makes it possible to prevent in advance the interference from a high power mobile station.

Furthermore, according to the present invention, a mobile communications system with high quality and high frequency usage efficiency can be configured with avoiding the interference, in such a system whose service area consists of a plurality of radio base stations assuming a various cell radii, or a system in which a plurality of systems, whose mobile stations that receive their services have different characteristics, share the same frequency band.

What is claimed is:

1. A channel selecting method in a mobile communications system including a plurality of radio base stations, comprising the steps of:

referring, in a particular one of the plurality of radio base stations, to transmission power read from a channel transmitted from each of remaining ones of the plurality of radio base stations;

correcting a threshold value of a received level used for deciding availability of the channel in the particular radio base station such that the threshold value is reduced when the transmission power is large, and that the threshold value is increased when the transmission power is small; and making a decision that the channel is available, in the particular radio base station, according to whether the received level measured in the channel is lower than the corrected threshold value.

2. A channel selecting method in a mobile communications system including a plurality of radio base stations, comprising the steps of:

referring, in a particular one of the plurality of radio base stations, to transmission power read from a channel transmitted from each of remaining ones of the plurality of radio base stations;

calculating, in the particular radio base station, a propagation loss between the particular radio base station and each of the remaining radio base stations; and making a decision that the channel is available, in the particular radio base station, according to whether a received level acquired by receiving the channel transmitted from each of the remaining radio base stations is less than a predetermined received level, and the propagation loss of the channel is less than a predetermined threshold value of the propagation loss.

3. Base station equipment installed in a particular radio base station in a mobile communications system including a plurality of radio base stations, said base station equipment comprising:

means for measuring a received level of a channel transmitted from each of remaining ones of the plurality of radio base stations;

means for reading a transmission power value of the channel from each of the remaining radio base stations; and means for making a decision on availability of the channel by the particular radio base station from the received level measured and the transmission power value read.

4. The base station equipment as claimed in claim 3, further comprising:

means for storing a threshold value of the received level in correspondence with the received level of the channel transmitted from each of the remaining radio base stations;

means for correcting, in accordance with the transmission power value of the channel from each of the remaining radio base stations, the threshold value of the received level that is stored; and means for making a decision on the availability of the channel in the particular radio base station by comparing the received level with the corrected threshold value.

5. The base station equipment as claimed in claim 3, further comprising:

means for storing a first threshold value corresponding to the received level of the channel transmitted from each of the remaining radio base stations;

means for calculating a propagation loss between the particular radio base station and each of the remaining radio base stations from the received level and the transmission power value of the channel from each of the remaining radio base stations;

means for storing a second threshold value in correspondence with the propagation loss calculated;

means for comparing the first threshold value with the received level;

means for comparing the second threshold value with the propagation loss; and means for making a decision on availability of the channel in the particular radio base station from a result of comparing the first threshold value with the received level, and a result of comparing the second threshold level with the propagation loss.

* * * * *